United States Patent [19]

David et al.

[11] Patent Number: 4,842,919

[45] Date of Patent: Jun. 27, 1989

[54] PAD FORMING METHOD

[75] Inventors: John R. David; Daniel P. Pohl, both of St. Paul, Minn.

[73] Assignee: Minnesota Mining and Manufacturing Company, St. Paul, Minn.

[21] Appl. No.: 10,213

[22] Filed: Feb. 3, 1987

[51] Int. Cl.[4] .................... B32B 3/10

[52] U.S. Cl. .................... 428/40; 428/137; 428/195; 281/15.1; 206/449; 206/813

[58] Field of Search .................... 428/40, 137, 354, 195; 281/15 R; 206/449, 484, 813; 235/494

[56] References Cited

U.S. PATENT DOCUMENTS

| | | | |
|---|---|---|---|
| 538,464 | 4/1895 | Palmer et al. . | |
| 808,578 | 12/1905 | Ruttinger | 164/48 |
| 1,296,934 | 3/1919 | Drouilly . | |
| 1,366,082 | 1/1921 | Knabe . | |
| 1,542,082 | 6/1925 | Nelson . | |
| 2,105,707 | 1/1938 | Stancliff | 242/56 |
| 2,208,774 | 7/1940 | Pierson | 33/129 |
| 2,265,498 | 12/1941 | Stancliff et al. | 242/56 |
| 2,703,612 | 3/1955 | Nye et al. | 164/42 |
| 2,725,980 | 12/1955 | Kimball | 206/59 |
| 2,805,828 | 9/1957 | Bachman | 242/63 |
| 2,836,018 | 5/1958 | Key | 51/281 |
| 2,852,074 | 9/1958 | Wahl et al. | 164/12 |
| 2,957,065 | 10/1960 | Bundegaard et al. | 219/19 |
| 3,160,044 | 12/1964 | Somerville | 83/19 |
| 3,163,066 | 12/1964 | Beaulieu et al. | 83/91 |
| 3,204,501 | 9/1965 | Lane | 83/10 |
| 3,245,302 | 4/1966 | Bayley | 83/614 |
| 3,477,325 | 11/1969 | Kracht et al. | 83/171 |
| 3,675,525 | 7/1972 | Ellison | 83/629 |
| 3,785,102 | 1/1974 | Amos | 428/40 X |
| 3,791,267 | 2/1974 | Brooks | 93/35 |
| 3,818,587 | 6/1974 | Williams | 29/606 |
| 3,845,948 | 11/1974 | Furbeck et al. | 270/40 |
| 4,014,535 | 3/1977 | Kleid et al. | 270/19 |
| 4,327,617 | 5/1982 | Budzich et al. | 83/419 |
| 4,409,870 | 10/1983 | Rynik et al. | 83/100 |
| 4,484,501 | 11/1984 | Ramcke | 83/255 |
| 4,650,706 | 3/1987 | Emmel | 428/194 X |

*Primary Examiner*—Alexander S. Thomas
*Attorney, Agent, or Firm*—Donald M. Sell; Walter N. Kirn; Leland D. Schultz

[57] ABSTRACT

A method for forming pads of pressure sensitive adhesive coated sheets with similar discontinuities (e.g., printed indicia or openings) on the sheets substantially aligned. A strip of pressure sensitive adhesive coated material is helically wound around the periphery of a roller to form a roll comprising a multiplicity of overlying layers of the strip by rotating the roller about its axis to pull the strip along a predetermined path onto the roller. Discontinuities are formed on the strip along the predetermined path at locations that are progressively increasingly spaced apart to compensate for the increasing circumference of the roll and which result in at least one set of discontinuities being located along the periphery of the roller in substantial alignment radially outwardly of the roller; and pads containing such aligned discontinuities are then cut from the roll.

5 Claims, 2 Drawing Sheets

PAD FORMING METHOD

TECHNICAL FIELD

The present method refers to methods for forming pads of pressure sensitive adhesive coated sheet material, the individual sheets of which pads have discontinuities such as printing or an opening in corresponding locations on the sheets.

BACKGROUND ART

A method for forming pads of pressure sensitive adhesive coated sheet material is know in which a strip of the pressure sensitive adhesive material is helically wound on the periphery of a roller to form a roll comprising a multiplicity of overlying layers of the strip by rotating the roller about its axis to pull the strip onto the roller; and then cutting one or more pads from the roll.

While such a method has been useful to form a pad from a uniform strip, heretofore it has not been useful for forming pads of individual sheets that have discontinuities such as printing or an opening in corresponding locations on the sheets, because the length of each successive wrap of the strip is slightly longer, thereby throwing discontinuities in uniform spaced relationship on the strip material out of register when that strip material is wound on the roller.

DISCLOSURE OF THE INVENTION

The present invention provides an improvement in the method described above for forming pads from a strip of pressure sensitive adhesive coated material that allows the individual sheets of a pad made by the improved method to have discontinuities such as printed indicia, openings, coated portions of the adhesive, or materials adhered to the sheets in corresponding locations on each sheet in the pad.

The improved method according to the present invention comprises the step of forming the discontinuities on the strip along a predetermined path along which the strip is pulled toward the roller at locations that are progressively increasingly spaced apart to compensate for the increasing circumference of the roll and which result in the location of at least one set of discontinuities along the periphery of the roller in substantial alignment radially outwardly of the roller.

Preferably the forming step comprises the steps of (1) providing a mechanism positioned along the predetermined path comprising a rotary member (e.g., a rotary printing plate or rotary die) having an periphery adapted to move in the direction of movement of the strip of pressure sensitive adhesive coated material along the predetermined path, which mechanism forms the discontinuity by progressively engaging the strip of pressure sensitive adhesive coated material along a transverse area; (2) causing the peripheral length of the roller to be an even multiple of the effective peripheral length of the rotary member; and (3) driving the rotary member and the roller at a fixed rotational speed ratio that generally matches the peripheral speed of the rotary member with the linear speed of the strip along the predetermined path portion as the first layer of the strip is wound around the periphery of the roller so that as the roll around the roller increases in thickness the strip along the predetermined path will be pulled at increasing linear speeds along the predetermined path that are faster than the effective peripheral speed of the rotary member to progressively increasingly space apart the discontinuities and progressively increase the length of successive discontinuities formed by the rotary member, thereby aligning edges of the sets of discontinuities generally radially outwardly of the roller.

Also, preferably the cutting step in the method according to the present invention comprises the steps of (1) transversely cutting the roll along the periphery of the roller at a location between pads to be formed; (2) removing the cut roll from the roller; (3) generally flattening the removed cut roll; and (4) cutting the pads from the generally flattened removed cut roll.

The method according to the present invention can further include the step of adhering a liner strip to a portion of each sheet in the pad along a corresponding edge of the sheet which can be useful to provide removable liners to facilitate separating one edge of sheets in the pad so that sheets can easily be removed from the pad.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
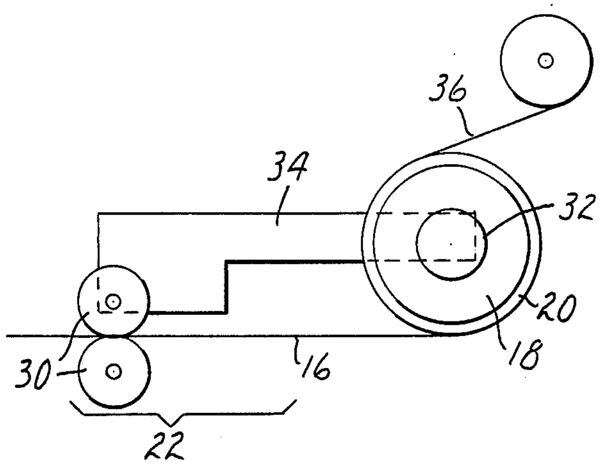
FIG. 1 is a schematic elevational view of mechanism that can be used in practicing the method according to the present invention.
Figure 2:
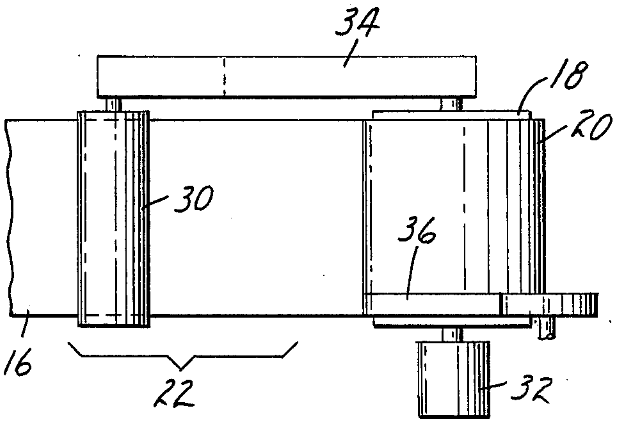
FIG. 2 is a plan view of the mechanism schematically shown in FIG. 1.
Figure 5:
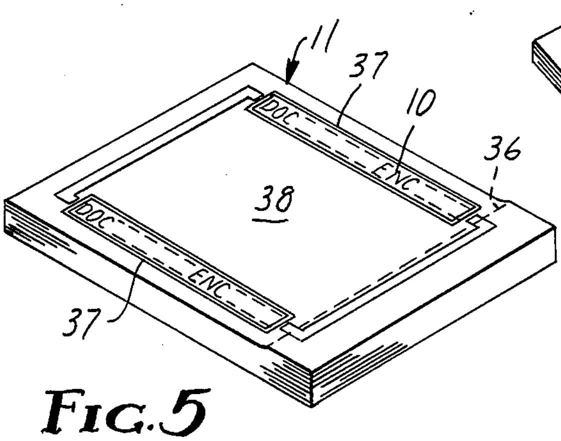
FIG. 5 is an enlarged perspective view of a first embodiment of a pad that can be made using the method schematically illustrated in FIGS. 1 through 4.
Figure 6:
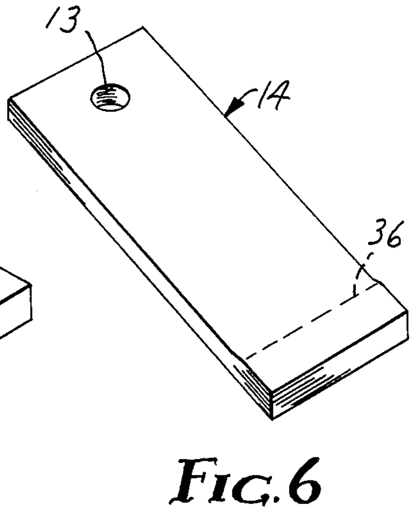
FIG. 6 is an enlarged perspective view of a second embodiment of a pad that can be made using the method schematically illustrated in FIGS. 1 through 4.

Referring now to FIGS. 1 and 2 of the drawing there is schematically illustrated a method according to the present invention for forming pads of pressure sensitive adhesive coated sheets with each sheet having a similar discontinuity (e.g., a discontinuity such as the printed indicia 10 shown on the sheets of a pad 11 illustrated in FIG. 5, or an opening 13 shown on the sheets of a pad 14 illustrated in FIG. 6) on each sheet substantially aligned with the same discontinuity on adjacent sheets.

Generally the method comprising the steps of (1) helically winding a strip 16 of pressure sensitive adhesive coated material around the periphery of a roller 18 to form a hollow cylindrical roll 20 comprising a multiplicity of overlying layers of the strip 16 by rotating the roller 18 about its axis to pull the strip 16 along a predetermined path 22 onto the roller 18; (2) forming discontinuities (e.g., printed indicia 10 or openings 13) sequentially on the strip along the predetermined path 22 at locations along the strip 16 that are progressively increasingly spaced apart to compensate for the increasing circumference of the roll 20 being formed around the roller 18 and which locate at least one set of discontinuities along the periphery of the roller 18 in substantial alignment radially outwardly of the roller 18; and (3) cutting at least one pad containing at least one set of aligned discontinuities from the roll 20.

Preferably, as illustrated in FIGS. 1 and 2, the forming step comprises the steps of (1) providing a mechanism positioned along the predetermined path 22 comprising rotary members 30 (e.g., rotary printing plates or rotary dies) having a periphery adapted to move in the direction of movement of the strip 16 of pressure sensitive adhesive coated material along the predetermined path 22 and to form the discontinuity by progressively engaging the strip 16 of pressure sensitive adhesive coated material along a transverse area having a shorter length along the path than the discontinuity; (2) causing the peripheral length of the roller 18 to be an even multiple of the effective peripheral length of the rotary members 30; and (3) driving the rotary members 30 and the roller 18 at a fixed rotational speed ratio that generally matches the peripheral speed of the rotary members 30 with the linear speed of the strip 16 along the predetermined path portion 22 as the first layer of the strip 16 is wound around the periphery of the roller 18 so that as the roll 20 of the strip material 16 around the roller 18 increases in thickness the strip 16 will be pulled at increasing linear speeds along the predetermined path 22 that are faster than the effective peripheral speed of the rotary members 30 and the strip 16 will slip between the rotary members 30 to progressively increasingly space apart the discontinuities and progressively increase the length of successive discontinuities formed by the rotary members 30, thereby aligning edges of the sets of discontinuities generally radially outwardly of the roller 18.

Driving the rotary members 30 and the roller 18 at a fixed rotational speed ratio that generally matches the peripheral speed of the rotary members 30 with the linear speed of the strip 16 along the predetermined path portion 22 as the first layer of the strip 16 is wound around the periphery of the roller 18 is preferably done by driving the roller 18 with an appropriately gear reduced electric drive motor 32, and driving the rotary members 30 from the roller 18 through the use of a mechanical drive unit 34 which includes the appropriate gear reduction units and drive couplings. Alternately, separate synchronized electrical or mechanical drive units could be used to drive the rotary members 30 and roller 18. Also, it should be possible to use other than rotary members to form the discontinuities such as ink-jet or reciprocating motion printers or laser cutters activated by movement of one or more portions of the periphery of the roller 18 past a predetermined fixed location adjacent its periphery.

Figure 3:
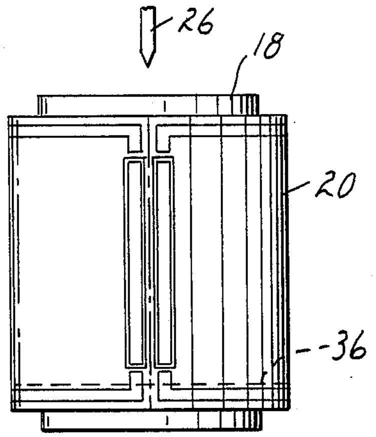
FIGS. 3 and 4 schematically illustrate additional steps to those shown in FIGS. 1 and 2 for practicing the method according to the present invention.

In the method according to the present invention the cutting step preferably comprises the step illustrated in FIG. 3 of (1) transversely cutting the roll 20 along the periphery of the roller 18 at a location between pads to be formed (which can be done manually with a utility knife 26 or by an automated cutter); (2) removing the cut roll 20 from the roller 18 and generally flattening the removed cut roll 20 as illustrated in FIG. 4 (which can be done manually); and (3) cutting pads 27 (FIG. 4) from the generally flattened removed cut roll 20 (which can be done with an appropriate die cutting device 28).

Figure 4:
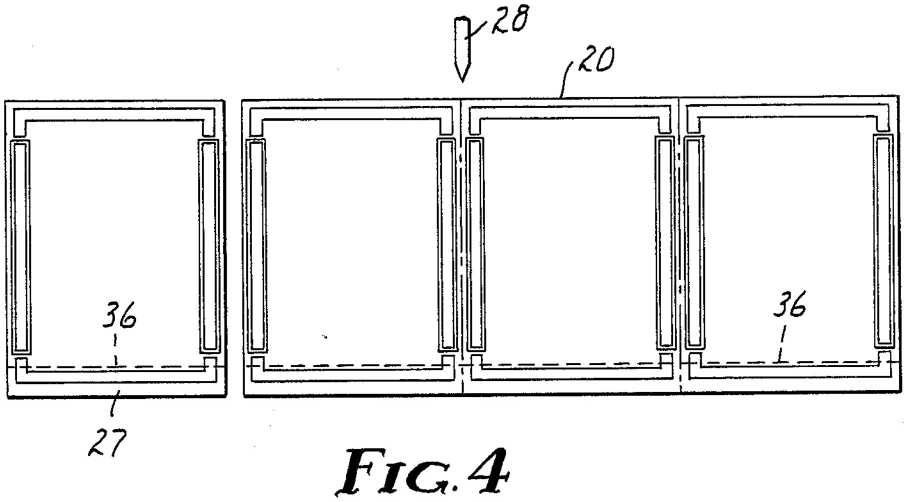

The method according to the present invention can further include the step of adhering a length of liner strip 36 to a portion of each sheet in a pad made by the method along one edge of the sheet by feeding a continuous length of the liner strip 36 onto the periphery of the roller 18 as is illustrated in FIGS. 1 and 2, which can result in the liner strips 36 illustrated in the pads 11 and 14 shown in FIGS. 3 and 4. Such liner strips 36 are typically easily removable from the sheets in the pad 11 or 14, and while present, facilitate separating the edges of sheets in the pad 11 or 14 so that the top sheet in the pad 11 or 14 can easily be removed from the pad 11 or 14.

FIG. 5 illustrates the pad 11 of pressure sensitive adhesive coated sheets with a similar discontinuity on each sheet in the form of the printed indicia 10 with the printed indicia 10 on each sheet in the pad 11 substantially aligned with the printed indicia 10 on adjacent sheets in the pad 11. Because of the slippage of the strip 16 between the printing plates 30 that occurs as the thickness of the roll 20 increases, the discontinuity or printed indicia 10 will increase slightly in size (e.g., typically about 0.01 percent) between adjacent sheets from the bottom most sheet to the topmost sheet in the pad 11.

When the pressure sensitive adhesive coated sheets in the pad 11 are transparent, it is also preferred to print under the printed indicia 10 an opaque background strip 37 of a color that contrasts with the printed indicia 10. The background strip 37 facilitates reading the printed indicia on the top sheet in the pad 11 which may be difficult when the background strip 37 is not present due to slight misalignments of the indicia 10 on the stacked sheets in the pad 11, and the background strip 37 masks such slight misalignment to improve the appearance of the pad 11.

The sheets in the pad 11 each further include a discontinuity in the form of a layer of adhesive masking material 38 in a rectangular pattern located centrally on the adhesive coated surface of the sheet with the printed indicia 10 extending around the masking material 38. The sheets of the pad 11 are thus particularly useful as covers for papers (such as shipping papers) attached to containers such as boxes and are essentially the same as the sheets previously provided in roll form, commercially designated No. 824 pouch Tape and available from Minnesota Mining and Manufacturing Company, St. Paul, Minn.

FIG. 6 illustrates the pad 14 of pressure sensitive adhesive coated sheets with a similar discontinuity on each sheet in the form of the opening 13 with the opening 13 on each sheet in the pad 14 substantially aligned with the opening 13 on adjacent sheets. Because of the slippage of the strip 16 through the rotary die 30 that occurs as the thickness of the roll 20 increases, the discontinuity or opening 13 will increase slightly in size by slightly elongating from the bottom most sheet to the topmost sheet in the pad 14.

The method according to the present invention has now been described with reference to one embodiment thereof, and with reference to two embodiments of pads made according to the present invention. It will be apparent to those skilled in the art that many changes can be made in the embodiments described without departing from the scope of the present invention. For example, pads according to the present invention with sheets having materials adhered to them to form the discontinuities can be made using the method according to the present invention. Thus the scope of the present invention should not be limited to the structures described in this application, but only by structures described by the language of the claims and the equivalents of those structures.

We claim:

1. A pad of pressure sensitive adhesive coated sheets with a similar discontinuity on each sheet substantially aligned with said discontinuity on adjacent sheets, said discontinuity increasing slightly in size from the bottom most sheet to the top most sheet in said pad, and wherein said discontinuity on each sheet is an opening through the sheet.

2. A pad of pressure sensitive adhesive coated sheets with a similar discontinuity on each sheet substantially aligned with the discontinuity on adjacent sheets, said discontinuity increasing slightly in size from the bottom most sheet to the top most sheet in said pad, and wherein said discontinuity on each sheet is printed indicia on the sheet.

3. A pad according to claim 2 wherein said discontinuity further includes a layer of adhesive masking material in a rectangular pattern located centrally on the adhesive coated surface of said sheet, and said printed indicia is around said masking material.

4. A pad according to claim 2 wherein said sheets are transparent and said discontinuity further includes an opaque background strip of a color that contrasts with the printed indicia under the printed indicia on each sheet.

5. A pad according to claim 4 wherein said discontinuity further includes a layer of transparent adhesive masking material in a rectangular pattern located centrally on the adhesive coated surface of said sheet, and said background strip and printed indicia are around said masking material.

* * * * *